United States Patent
Chmela et al.

(10) Patent No.: US 6,581,421 B2
(45) Date of Patent: Jun. 24, 2003

(54) SECURITY SYSTEM

(76) Inventors: James Chmela, 1961 Tunbridge Ct., Algonquin, IL (US) 60102; John Chmela, 1234 Valley Lake Dr., Schaumburg, IL (US) 60195

( * ) Notice: Subject to any disclaimer, the term of this patent is extended or adjusted under 35 U.S.C. 154(b) by 136 days.

(21) Appl. No.: 09/796,916

(22) Filed: Mar. 1, 2001

(65) Prior Publication Data

US 2002/0162366 A1 Nov. 7, 2002

(51) Int. Cl.$^7$ .............................................. E05B 69/00
(52) U.S. Cl. ...................... 70/58; 70/30; 70/49; 70/14; 411/383; 411/395; 411/910; 403/291
(58) Field of Search ..................... 411/340, 34, 910, 411/999, 383, 395; 70/14, 18, 57, 58, 30, 49, 233; 403/291, 406.1; 248/551–552

(56) References Cited

U.S. PATENT DOCUMENTS

| | | | | | |
|---|---|---|---|---|---|
| 1,010,301 A | * | 11/1911 | Neats | ...................... | 411/383 X |
| 1,828,287 A | * | 10/1931 | MacBean | ................ | 411/395 X |
| 2,111,368 A | * | 3/1938 | Kron | ......................... | 248/160 |
| 3,457,573 A | * | 7/1969 | Patyna | .................... | 411/383 X |
| 3,859,826 A | * | 1/1975 | Singer et al. | .................. | 70/58 |
| 4,118,902 A | * | 10/1978 | Saxton | ...................... | 70/58 X |
| 4,295,765 A | * | 10/1981 | Burke | .................... | 411/395 X |
| 4,302,137 A | * | 11/1981 | Hart | ....................... | 411/910 X |
| 4,448,049 A | * | 5/1984 | Murray | ........................... | 70/58 |
| 4,666,106 A | * | 5/1987 | Kohout | ...................... | 70/14 X |
| 4,971,502 A | * | 11/1990 | Oh | ............................ | 411/340 |
| 5,061,134 A | * | 10/1991 | Oh | ............................ | 411/385 |
| 5,146,205 A | * | 9/1992 | Keifer et al. | ............... | 340/568 |
| 5,197,839 A | * | 3/1993 | Willey et al. | ............... | 411/340 |
| 5,332,251 A | * | 7/1994 | Farquhar | .................... | 70/14 X |
| 5,341,124 A | * | 8/1994 | Leyden et al. | .............. | 340/568 |
| 5,421,667 A | * | 6/1995 | Leyden et al. | ............ | 403/406.1 |
| 5,472,304 A | * | 12/1995 | Gold | .......................... | 411/344 |
| 5,584,629 A | * | 12/1996 | Bailey et al. | ........... | 411/383 X |
| 5,622,443 A | * | 4/1997 | Lampert et al. | ............ | 403/291 |
| 5,651,651 A | * | 7/1997 | Spencer | .................. | 411/910 X |
| 5,658,285 A | * | 8/1997 | Marnay et al. | .............. | 411/395 |
| 5,709,110 A | * | 1/1998 | Greenfield et al. | ............ | 70/58 |
| 5,832,754 A | * | 11/1998 | McKenzie | ...................... | 70/58 |
| 6,019,304 A | * | 2/2000 | Skowronski et al. | ........ | 242/373 |
| 6,027,277 A | * | 2/2000 | Leyden et al. | .............. | 403/291 |
| 6,087,939 A | * | 7/2000 | Leyden et al. | ........... | 340/568.2 |
| 6,105,922 A | * | 8/2000 | Derman | ...................... | 70/58 X |
| 6,116,942 A | * | 9/2000 | Chen et al. | ............. | 411/395 X |
| 6,155,715 A | * | 12/2000 | Lake et al. | .................. | 70/64 X |
| 6,341,927 B2 | * | 1/2002 | Hampson et al. | ........... | 411/910 |
| 6,401,502 B1 | * | 6/2002 | Yang | ............................ | 70/30 |
| 6,443,680 B1 | * | 9/2002 | Bodin | .................... | 411/383 X |
| 6,446,816 B1 | * | 9/2002 | Miller | ........................... | 211/5 |

* cited by examiner

*Primary Examiner*—Suzanne Dino Barrett
(74) *Attorney, Agent, or Firm*—Pendorf & Cutliff

(57) ABSTRACT

A security system for connecting a cable to consumer articles, such as cameras, and the like, to prevent unauthorized removal of the articles from a predetermined area while being displayed in retail establishments on open shelves. The system in its most basic form comprises a device including a security cable and a threaded fastener. The security cable is passed through the threaded fastener, and then the threaded fastener is attached into the body of the article. The threaded fastener head has a special configuration and cannot be removed without a special key, thereby preventing the unauthorized removal of the secured property. The threaded fastener also includes a circular borehole through the entire length of the threaded fastener to allow the cable to pass through the opening, and a step is provided inside the borehole to stop the cable from coming off the fastener. Optionally, a reel, an alarm, or a fastener cover can be added to the basic system to make more difficult the removal of the security cable from the article.

19 Claims, 3 Drawing Sheets

SECURITY SYSTEM

FIELD OF THE INVENTION

The present invention relates to a security system useful for preventing portable articles from being easily removed by unauthorized persons. More specifically, the invention concerns security systems for connecting a cable to consumer articles, such as cameras, and the like, to prevent unauthorized removal of the articles from a predetermined area while being displayed in retail establishments on open shelves.

DESCRIPTION OF THE RELATED ART

Consumer articles, such as cameras, and the like, are commonly displayed in retail stores on open shelves so as to allow the consumer to compare brands. With the large number of articles and consumers looking around in the store, it is easy for persons to walk off unnoticed with displayed articles.

A variety of techniques and apparatus have been developed through the years for preventing the unauthorized removal of articles that are commonly displayed in retail establishments on open shelves to allow the consumer to compare brands.

While many types of security devices have been made available in the past for deterring the theft of various types of articles, the high cost and great popularity of current articles require that the articles be provided with a higher degree of security, while at the same time permitting the consumer to pick the articles up to examine them and, in some cases, to actually operate the articles to assist in the purchase decision.

The prior art shows that protecting articles from theft usually requires securing the articles to an immovable object. Various types of anti-theft systems for tying down and connecting portable articles with heavy-duty security cables have been developed.

The security cables include a steel cable and various attachment hardware to anchor the portable articles to a work station, which is relatively stationary. Typically, a cable attachment fixture is mounted to a portion of the surface of the articles and to the surface of a work station by screw mounted fittings and/or adhesive plates. For example, U.S. Pat. No. 4,004,440 to Dreyer, entitled "Cable Lock for Small Appliances," teaches a device for locking an article to a fixed base comprising a flexible cable secured at one end to a key operated lock, and the other end to an anchor block.

One serious drawback with these security cables is that because the cables are made sufficiently long to allow the consumer to inspect the articles, then a substantial length of the cable will normally hang down close to or on the floor, and the persons passing by may trip on, or become entangled with, the excess cable. Also, the security cable can be entangled with itself or other articles.

Systems for securing articles known in the art, as described hereinabove, are suitable only for use if the article to be secured is large enough to accept hardware, or large enough to enable direct attachment of the steel cable through the article chassis.

A number of previously available devices have been known to incorporate mounting brackets attached to the body of the article for securing the article to a supporting surface. Such devices lack versatility in that the restraining arrangements cannot be adjusted to accommodate articles of different sizes, but rather must be custom built to accommodate the dimensions of the particular article to be secured.

Another problem with this type of device is that it is difficult to connect the device to the article without causing damage to the body of the article.

Various universal type-securing systems for use with a wide variety of articles have also been developed, such as for example, systems that make use of adhesive pads and steel cables. However, the low cost and flexibility provided by such systems typically come at the cost of reduced security.

While these security systems fulfill their respective, particular objectives and requirements, the aforementioned patents do not describe a security system that allows the consumer to pick the article up without a bracket or an adhesive pad mounted on the article.

Thus, there is a need in the art for an improvement in anti-theft devices for articles in which the anti-theft article does not require any mounting space on the article housing, allows the consumer to pick the articles up to examine them and, in some cases, to actually operate the articles to assist in the purchase decision, and can be adapted to any existing article in a simple and inexpensive way without damaging the article.

SUMMARY OF THE INVENTION

A prime object of the invention is to provide a security system for deterring the theft or unauthorized removal of an article from an open shelf, which security system can be mounted to the article without damaging the article.

It is a further object to provide a security system for articles, which is of low cost, easy to use, flexible, and adaptable to different physical article layouts.

Finally, the invention further contemplates a security system for securing a high value consumer article that is, for example, a camera.

In view of the foregoing disadvantages inherent in the known types of security systems in the prior art, the present inventor discovered a unique security system that does not require any bracket or adhesive pad mounted on the article housing, allows the consumer to pick the articles up to examine them and, in some cases, to actually operate the articles to assist in the purchase decision, which system can be adapted to any existing article in a simple and inexpensive way without damaging the article.

More particularly, the system in its most basic form comprises a device including (1) a security cable having an end stop and (2) a threaded fastener. The threaded fastener includes a circular borehole through its entire length to allow the cable to pass through the borehole, and a step inside the borehole to stop the cable from coming off the fastener. After the security cable is passed through the threaded fastener, then the threaded fastener is secured into a receptacle in the body of the article to be secured. The threaded fastener head has a special configuration and cannot be removed without a special key, thereby preventing the unauthorized removal of the secured property.

In a first preferred embodiment, the invention comprises a system including a reel, a security cable, and a threaded fastener. The reel comprises a housing, a spool, and a spring.

In a second preferred embodiment, the security cable includes a reel having an electronic system connected to an alarm. The cable for this embodiment should be sensitive to security breech in order to actuate the electronic alarm system to which it is connected.

Further, in a third embodiment of the invention, the security cable includes a fastener cover to conceal the keyholes of the threaded fastener.

The invention contemplates using the above system to secure a consumer article by simply screwing the threaded fastener into either a tripod hole as conventionally found in cameras, video cameras, telescopes, and the like, or by removing a screw from an article to be secured and screwing the threaded fastener into the vacated hole.

The foregoing has outlined rather broadly the more pertinent and important features of the present invention in order that the detailed description of the invention that follows may be better understood, and the present contribution to the art can be more fully appreciated. Additional features of the invention will be described hereinafter, which form the subject of the claims of the invention. It should be appreciated by those skilled in the art that the conception and the specific embodiments disclosed may be readily utilized as a basis for modifying other security systems for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

Further advantageous embodiments, as well as advantages achieved by means of the invention, will be explained below in greater detail with reference to the drawing, which shows a structure by way of example, and in which.

DESCRIPTION OF THE INVENTION

Figure 1:
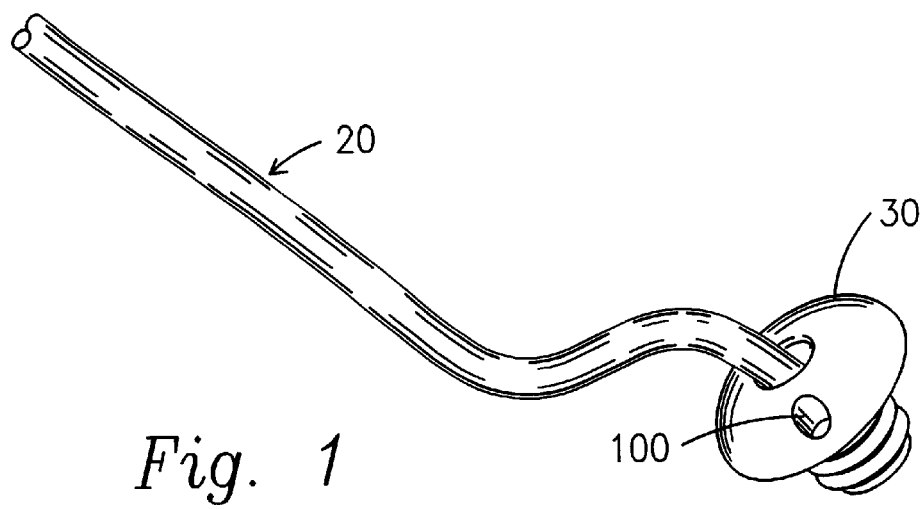
FIG. 1 is a perspective view of the basic form of the present invention showing a security cable passing through the threaded fastener.
Figure 3:
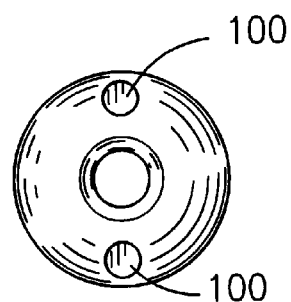
FIG. 3 is a top view of a threaded fastener of the present invention.
Figure 4:
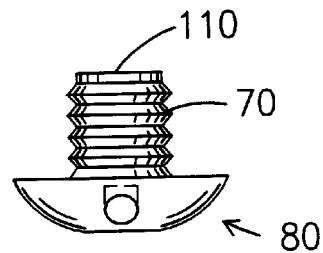
FIG. 4 is a front view of the threaded fastener according to the present invention.
Figure 5:
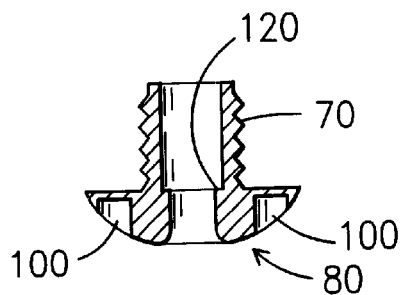
FIG. 5 is a cross sectional view of the threaded fastener of the present invention taken along lines A—A of FIG. 4 showing the step inside the borehole.
Figure 6:
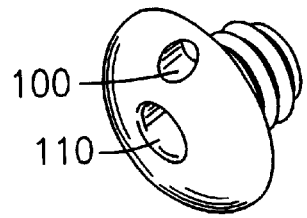
FIG. 6 is a side view of the threaded fastener according to the present invention.

FIG. 1 shows the security system of the present invention in its basic form. The system comprises a threaded fastener 30 through which a security cable 20 is passed.

Figure 2:
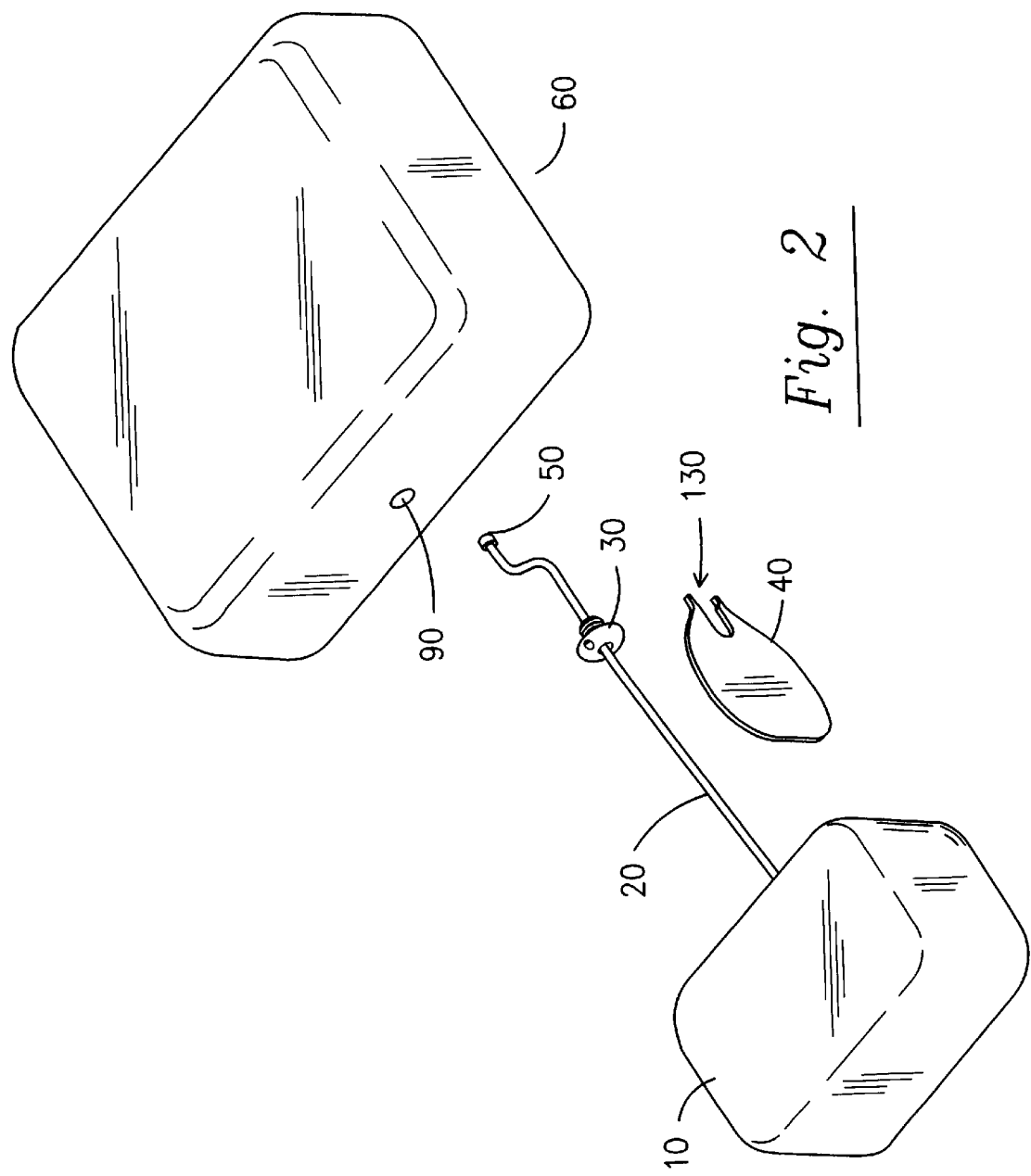
FIG. 2 is a perspective view of the security system according to the first embodiment of the present invention.
Figure 8:
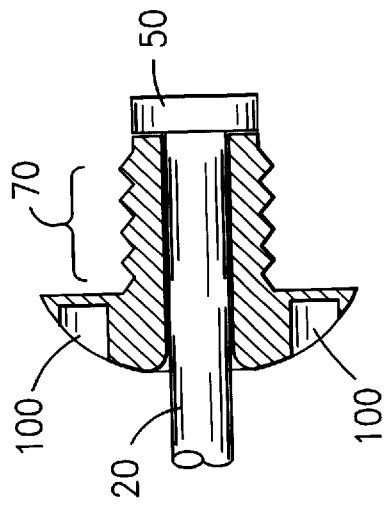
FIG. 8 is a side view of the security system of the present invention showing the fastener cover.
Figure 9:
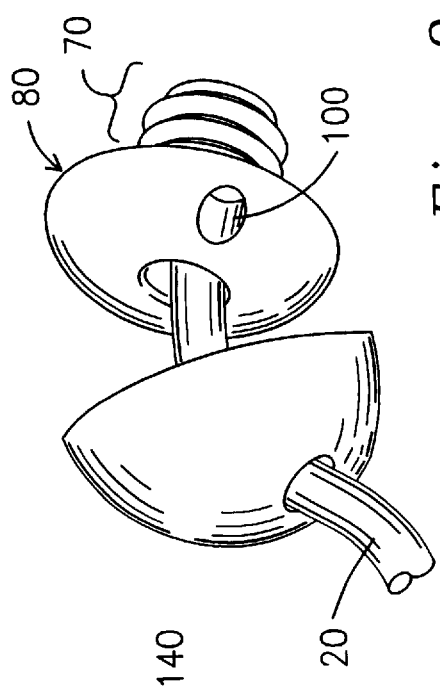
FIG. 9 is a side view of the security system of the present invention showing the security cable welded to the threaded fastener.
Figure 7:
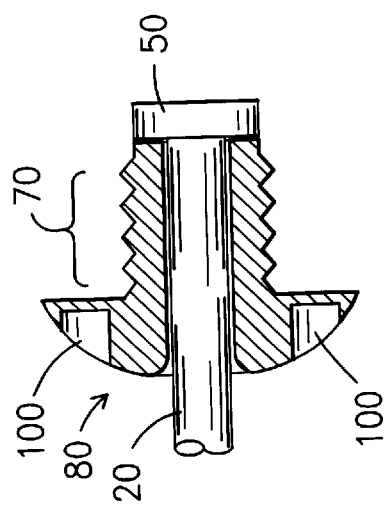
FIG. 7 is a cross sectional view of the threaded fastener of the present invention without showing the step inside the borehole.

FIG. 2 shows the security system of the present invention in the first preferred embodiment. The system comprises a reel 10, a security cable 20, an externally threaded fastener 30, and a key device 40. The system is shown attached to an article to be secured 60 having an internal receptacle 90.

The details of the security system can be seen in the remainder of FIGS. 3–6, taken in conjunction with FIGS. 1 and 2.

The individual elements of the invention will now be described in greater detail.

Security Cable

The security cable 20 is preferably constructed of flexible steel having a plastic sheath. The security cable includes the stop 50 formed at the distal end of the cable. The stop can take many forms such as a crimp-on sleeve, a knot, a ferrule, a clamp, or some other means to add an enlargement to the cable, and to prevent it from pulling out from the threaded fastener 30.

When the system is used with the reel, the cable length is typically from about two feet long to 8 feet long to allow sufficient latitude of movement of the article from its displayed position.

If the system is used without the reel, the length of the cable can be from about two feet to four feet to avoid the security cable becoming entangled with itself or other articles.

Security Threaded Fastener

To connect the security cable 20 to the article 60, a threaded fastener 30 is used.

The threaded fastener of the present invention is preferably made from a hard strength plastic material such as Nylon, Acetal-Delrin™, polycarbonate, polypropylene, polyvinylchloride and any other suitable plastic materials capable of being injection molded.

In another preferred form, the threaded fastener of the present invention is made from a metal such as steel, brass, bronze, aluminum, and the like.

The threaded fastener 30 includes a head 80 and an external threaded body 70 adjacent to the head.

The thread pitch/diameter of the external threaded body 70 are preferably the same as the pitch/diameter of the receptacle 90 in the article 60.

The head 80 has a low rounded profile to prevent people from unscrewing the threaded fastener with their fingers or conventional tools, and keyholes 100 to allow the threaded fastener to be removed only with a driving tool 40 adapted for insertion in the keyholes.

A circular borehole 110 extends through the center axis of the threaded fastener, through the entire length of the threaded fastener to allow clearance of the cable diameter, but not permitting the cable stop to pass through.

In another preferred form, the diameter of borehole in the external threaded body is greater than the diameter of the borehole on the threaded fastener head, thus hereby forming a seat 120 to prevent the cable stop from passing through.

Keyholes and Driving Tool

A problem with the security fasteners of the prior art is that by having exposed holes, the fastener can be easily removed by a thief using a standard tool. The present invention presents an improved design that will make it more difficult for a thief to rotate the exposed holes by using a standard tool.

The present invention presents keyholes in combination with the presence of the security cable interposed between the keyholes, which will make it difficult to rotate the keyholes with a standard tool.

A special driving tool 40 has a complementary fitting 130 adapted for insertion in the keyholes 110 of the threaded fastener and allow the threaded fastener to be rotated with the tool 40 for connecting/disconnecting the article 60.

The threaded fastener of the present invention optionally will include an O-ring having a central aperture through which the external threaded body of the threaded fastener extends.

In a first preferred embodiment of the present invention, the distance the article can be removed from the shelf is limited by the length of the security cable connected to a reel 10. The reel is designed especially for purchase applications where the merchandise can be demonstrated by the salesperson or easily handled by the customer while at the same time, the product is held captive to the shelf on which it is displayed.

The reel comprises a housing defining an internal space, a spool mounted for rotation within the internal housing space, and a spring hub rotatably supported in the housing. The components of the reel, such as the housing and spring hub, are preferably precision manufactured of a high impact plastic, such as polystyrene.

The security cable is connected to the reel and can be selectively retractable within the internal housing space to a first position and extendable to a second position.

The second preferred embodiment of the present invention includes a security system having a security cable, a threaded fastener, and a reel suitable for actuating an alarm if the security cable is cut.

In order to render more difficult the quick removal of the threaded fastener, the third preferred embodiment of the present invention includes a fastener cover 140 slidably mounted on the security cable to conceal the keyholes of the threaded fastener.

As described in the above, the threaded fastener moves freely through the security cable, and in order to secure the threaded fastener to the article, it is necessary to rotate the threaded fastener into the receptacle in the body of the article.

In a less preferred embodiment of the invention, the security cable can be glued/welded to the threaded fastener, which will prevent the threaded fastener from being easily rotated into the receptacle in the body of the article. In order to secure the threaded fastener to the article, it is necessary to rotate the article onto the non-rotating fastener.

In another less preferred embodiment of the invention, the article has a soft body, and the threaded fastener can be self-threading or self-tapping into the article.

The cover includes a central opening through which the security cable is passed through. The diameter of the opening is preferably slightly larger than the diameter of the security cable in order to allow the cover to slide over the security cable.

Finally, the invention contemplates using the above system to secure a consumer article by simply screwing the threaded fastener into either a tripod hole as conventionally found in cameras, video cameras, telescopes, and the like, or by removing a screw from an article to be secured and screwing the threaded fastener into the vacated hole.

The operation of the security system, including the threaded fastener, is described with reference to a specific example. It should be understood that the dimensions of the threaded fastener given in the Example are specific to one size fastener, and other sizes of the same could be employed without departing from the scope of the invention.

EXAMPLE

| External threaded body | |
|---|---|
| Height dimension: | 0.250 in. |
| Borehole dimension: | 0.149 in. |
| Threaded Pith diameter: | 20 NC |

| -continued | |
|---|---|
| Head | |
| Diameter of fastener: | 0.500 in. |
| Diameter of borehole: | 0.125 in. |
| Diameter of keyholes: | 0.062 in. |
| Distance between the keyholes: | 0.312 in |

The owner of the store can connect a security cable having a stop at the distal end to an article having a receptacle by the use of an externally threaded fastener.

The externally threaded fastener (20 NC thread) includes a circular borehole (0.149 inches in the body portion and 0.125 inches in the head portion) through its entire length, large enough to allow the cable (less than 0.149 inches in diameter) to pass through, but small enough to prevent the cable stop (more than 0.125 inches) from coming off the fastener.

By passing the security cable through the borehole in the externally threaded fastener, installing the externally threaded fastener to the receptacle in the article (preferably same pitch/diameter as the externally threaded fastener), and tightening the threaded fastener to the article by using a matching driving tool, the article will be secured to the security cable.

The foregoing disclosure of specific embodiments is intended to be illustrative of the broad concepts comprehended by the invention.

From the above description, it is clear that the preferred embodiment achieves the objects of the present invention. Alternative embodiments and various modifications may be apparent to those skilled in the art. These alternatives and modifications are considered to be within the spirit and scope of the present invention.

What is claimed:

1. A threaded fastener for securing a cable having a cable stop to an article having a receptacle, said threaded fastener comprising:

an external threaded body having a longitudinal center axis;

a head disposed on one end of the external threaded body, the head having a longitudinal center axis and a borehole extending though the center axis of the head; and a circular borehole extending through the center axis of the threaded fastener;

wherein the diameter of the borehole in the external threaded body is greater than the diameter of the borehole on the head, hereby forming a seat to prevent the cable stop from being removed from the threaded fastener.

2. A threaded fastener according to claim 1, wherein the head has a rounded profile and a pair of keyholes on the side of the head opposite to the threaded body.

3. A threaded fastener according to claim 1, wherein the threaded fastener is made from a hard strength plastic material selected from the group consisting of Nylon, Polycarbonate, polypropylene, and polyvinylchloride.

4. A threaded fastener according to claim 1, wherein the threaded fastener is made from a metal selected from the group consisting of steel, brass, bronze and aluminum.

5. A threaded fastener according to claim 1, further comprising a driving tool adapted for insertion in the keyholes.

6. A security system for connecting a cable to an article having a receptacle in the body comprising:

a security cable having a cable stop at the distal end; and a threaded fastener including an external threaded body having a longitudinal center axis; a head disposed on one end of the external threaded body, the head having a longitudinal center axis and a borehole extending though the center axis of the head; and a circular borehole extending through the entire length of the fastener;

wherein the security cable is passed through the threaded fastener;

wherein the threaded fastener is secured into the receptacle in the article.

7. A security system for connecting a cable to an article having a receptacle in the body comprising:

a security cable having a cable stop at the distal end; and a threaded fastener including an external threaded body having a longitudinal center axis; a head disposed on one end of the external threaded body, the head having a longitudinal center axis and a borehole extending though the center axis of the head; and a circular borehole extending through the entire length of the fastener;

wherein the security cable is passed through the threaded fastener;

wherein the threaded fastener is secured into the receptacle in the article; and wherein the head further includes a rounded profile and a pair of keyholes.

8. A security system for connecting a cable to an article having a receptacle in the body comprising:

a security cable having a cable stop at the distal end; and a threaded fastener including an external threaded body having a longitudinal center axis; a head disposed on one end of the external threaded body, the head having a longitudinal center axis and a borehole extending though the center axis of the head; and a circular borehole extending through the entire length of the fastener;

wherein the security cable is passed through the threaded fastener;

wherein the threaded fastener is secured into the receptacle in the article; and wherein the diameter of the borehole in the external threaded body is greater than the diameter of the borehole on the head, hereby forming a seat to prevent the cable stop from being removed from the threaded fastener.

9. A security system for connecting a cable to an article having receptacle in the body comprising:

a security cable having a cable stop at the distal end; and a threaded fastener including an external threaded body having a longitudinal center axis; a head disposed on one end of the external threaded body, the head having a longitudinal center axis and a borehole extending though the center axis of the head; and a circular borehole extending through the entire length of the fastener;

wherein the security cable is passed through the threaded fastener;

wherein the threaded fastener is secured into the receptacle in the article; and wherein the diameter of the external threaded body are the same as the diameter of the receptacle in the article.

10. A security system according to claim 6, wherein the threaded fastener moves freely through the security cable.

11. A security system according to claim 6, wherein the threaded fastener is welded to the security cable.

12. A security system for connecting a cable to an article having a receptacle in the body comprising:

a reel comprising a housing defining an internal space;

a spool mounted for rotation within the internal housing space and a spring hub rotatably supported in the housing;

a security cable connected to the reel at one end and having a cable stop at the other end; and a threaded fastener including an external threaded body having a longitudinal center axis; a head disposed on one end of the external threaded body; and a circular borehole extending through the entire length of the fastener;

wherein the security cable is passed through the threaded fastener;

wherein the threaded fastener is secured into the receptacle in the article.

13. The security system according to claim 12, wherein the reel further comprises an alarm.

14. The security system according to claim 12, wherein the head further includes a rounded profile and a pair of keyholes.

15. A security system according to claim 12, wherein the diameter of the borehole in the external threaded body is greater than the diameter of the borehole on the head, hereby forming a seat to prevent the cable stop from being removed from the threaded fastener.

16. A security system according to claim 12, wherein the diameter of the external threaded body are the same as the diameter of the receptacle in the article.

17. The security system according to claim 12, wherein the threaded fastener is made from a hard strength plastic material selected from the group consisting of Nylon, Polycarbonate, polypropylene, and polyvinylchloride.

18. The security system according to claim 12, wherein the security cable further comprises a threaded fastener cover to confine the security fastener.

19. A method for connecting a cable to an article having a receptacle in the body comprising:

providing an article having a receptacle;

installing a reel in the open shelf, wherein the reel comprises a housing defining an internal space, a spool mounted for rotation within the internal housing space, and a spring hub rotatably supported in the housing;

providing a security connected to the reel at one end and having a cable stop at the other end; and providing a threaded fastener including an external threaded body having a longitudinal center axis; a head disposed on one end of the external threaded body; and a circular borehole extending through the entire length of the fastener;

passing the security cable through the borehole in threaded fastener;

tying the threaded fastener into the article by rotating the threaded fastener;

whereby the security cable attached to the article cannot be separated from the article, and the article to which the security cable is attached cannot be transported beyond a distance permitted by the length of the security cable.

* * * * *